2,979,541

REACTION OF METHANE AND CARBON TETRACHLORIDE

Harold M. Pitt, Lafayette, and Harry Bender, El Cerrito, Calif., assignors to Stauffer Chemical Company, a corporation of Delaware No Drawing. Filed Mar. 23, 1960, Ser. No. 16,944

2 Claims. (Cl. 260—654)

This invention relates in general to a hydrogen exchange reaction and more particularly to a vapor phase reaction between carbon tetrachloride and methane so as to reduce the carbon tetrachloride to chloroform and chlorinate the methane (which serves as the reducing agent) with the production of a relatively large quantity of vinylidene chloride and methyl chloride.

It is known to react carbon tetrachloride and methane in a reactor having an added surface such as carbon, pumice, etc., to yield a variety of products. This method does not produce vinylidene chloride and apparently produces no methyl chloride.

It has now been found that where carbon tetrachloride is heated to a temperature between about 400° C. and 650° C. and preferably between about 575° C. and 650° C., a vapor phase reaction takes place wherein the carbon tetrachloride is reduced to chloroform and the methane picks up chloride to yield large quantities of vinylidene chloride and methyl chloride. Such a process may be carried out with residence times of between about 0.1 and 20 seconds and preferably between about 1 and 5 seconds. The two competing reactions taking place yield the aforementioned reaction products plus HCl and by varying the reaction conditions, as noted in the examples below, either the vinylidene chloride or the methyl chloride may be made to predominate. The vinylidene chloride-yielding reaction is apparently a radical-radical interaction. It is important that the reaction be carried out in a smooth walled reactor such as a Vycor or quartz tube, a carbon tube, or a stainless steel or Monel metal reactor. Since the wall surface must be kept to a minimum, the absence of carbon, pumice, broken porcelain and the like is imperative.

It is well known that methane reacts with a chlorinating agent only with great difficulty because of the symmetrical nature of the former and hence this reaction yielding large quantities of methyl chloride and/or vinylidene chloride, with accompanying quantities of chloroform, is of considerable value since it represents a process which may be carried out in an economical fashion with brief reaction times.

Examples are set forth below for illustrative purposes, and these are not to be interpreted as imposing limitations on the scope of the invention other than as set forth in the appended claims.

In the examples, 60 cc. Vycor tubes were used, the $CCl_4$ and the methane being metered, the $CCl_4$ being vaporized and the two gases mixed just before being allowed to enter the reactor. Analysis of the product was made by a Beckman GC-2 gas chromatograph.

EXAMPLE 1

Carbon tetrachloride (.006 mols/min.) and $CH_4$ (.014 mols/min.) were mixed and fed to a 60 cc. Vycor reactor. The unreacted methane and produced HCl were stripped of condensible liquids at Dry Ice temperatures. The liquid products were analyzed with results as follows:

Mol percent $CCl_4$ feed represented by each product; temperature of 587° C.

| Product: | Mol percent |
|---|---|
| $CHCl_3$ | 3.07 |
| $CH_2=CCl_2$ | 1.0 |
| $CH_2Cl_2$ | .56 |
| $CH_3Cl$ | 1.6 |

EXAMPLE 2

*Procedure and flow rate as in Example 1*

Mol percent $CCl_4$ feed represented by each product; temperature of 595° C.

| Product: | Mol percent |
|---|---|
| $CHCl_3$ | 4.5 |
| $CH_2=CCl_2$ | 2.14 |
| $CH_2Cl_2$ | .77 |
| $CH_3Cl$ | 3.25 |
| $CCl_2=CHCl$ | .25 |

EXAMPLE 3

*Procedure and flow rate as in Example 1*

Mol percent $CCl_4$ feed represented by each product; temperature of 603° C.

| Product: | Mol percent |
|---|---|
| $CHCl_3$ | 6.0 |
| $CH_2=CCl_2$ | 3.5 |
| $CH_2Cl_2$ | 1.24 |
| $CH_3Cl$ | 4.4 |
| $CCl_2=CHCl$ | .45 |

EXAMPLE 4

*Procedure and flow rate as in Example 1*

Mol percent $CCl_4$ feed represented by each product; temperature of 618° C.

| Product: | Mol percent |
|---|---|
| $CHCl_3$ | 10.75 |
| $CH_2=CCl_2$ | 8.3 |
| $CH_2Cl_2$ | 2.04 |
| $CH_3Cl$ | 9.25 |
| $CCl_2=CHCl$ | 1.28 |

EXAMPLE 5

*Procedure as in Example 1; flow of $CCl_4$, .012 mol/min.; $CH_4$, .024 mol/min.*

Mol percent $CCl_4$ feed represented by each product; temperature of 615° C.

| Product: | Mol percent |
|---|---|
| $CHCl_3$ | 3.28 |
| $CH_2=CCl_2$ | 2.38 |
| $CH_2Cl_2$ | .655 |
| $CH_3Cl$ | 5.0 |
| $CCl_2=CHCl$ | .24 |

EXAMPLE 6

*Procedure as in Example 1; flow rate as in Example 5*

Mol percent $CCl_4$ feed represented by each product; temperature of 635° C.

| Product: | Mol percent |
|---|---|
| $CHCl_3$ | 7.75 |
| $CH_2=CCl_2$ | 8.05 |
| $CH_2Cl_2$ | 1.81 |
| $CH_3Cl$ | 8.54 |
| $CCl_2=CHCl$ | 1.39 |

Obviously, many modifications and variations may be made without departing from the spirit and scope of this

We claim:

1. A process for the production of chloroform, vinylidene chloride and methyl chloride comprising reacting carbon tetrachloride and methane at a temperature of between about 400° C. and 650° C. for a period of between about 0.1 and 20 seconds, said reaction taking place in a smooth walled reaction zone in the absence of an added surface material.

2. A process for the production of chloroform, vinylidene chloride and methyl chloride comprising reacting carbon tetrachloride and methane at a temperature of between about 575° C. and 650° C. for a period of between about 1 and 5 seconds, said reaction taking place in a smooth walled reaction zone in the absence of an added surface material.

No references cited.